US006967953B2

United States Patent
Chen et al.

(10) Patent No.: US 6,967,953 B2
(45) Date of Patent: Nov. 22, 2005

(54) ATM COMMUNICATION SYSTEM AND METHOD FOR UTOPIA INTERFACE

(75) Inventors: Chyunger Chen, Taichung (TW); Midas Lee, Miaoli (TW); Hongbin Shin, Taoyuan (TW)

(73) Assignee: Tailyn Communication Company, Ltd., Taoyuan (TW)

( * ) Notice: Subject to any disclaimer, the term of this patent is extended or adjusted under 35 U.S.C. 154(b) by 559 days.

(21) Appl. No.: 10/107,145

(22) Filed: Mar. 28, 2002

(65) Prior Publication Data

US 2003/0043808 A1    Mar. 6, 2003

(30) Foreign Application Priority Data

Aug. 30, 2001 (TW) .............................. 90121425 A

(51) Int. Cl.[7] .......................................... H04L 12/28
(52) U.S. Cl. ................................ 370/395.1; 370/395.3
(58) Field of Search ................................ 370/474–475, 370/449, 342, 360–362, 424, 280, 390–397, 370/462, 330; 725/114, 129; 710/305; 340/505, 340/10.31; 375/114, 129, 131

(56) References Cited

U.S. PATENT DOCUMENTS

| | | | | |
|---|---|---|---|---|
| 4,773,065 A | * | 9/1988 | Kobayashi et al. | 370/362 |
| 4,811,338 A | * | 3/1989 | Haruyama et al. | 370/462 |
| 5,745,837 A | * | 4/1998 | Fuhrmann | 725/114 |
| 5,991,308 A | * | 11/1999 | Fuhrmann et al. | 370/395.53 |
| 6,356,557 B1 | * | 3/2002 | Nichols et al. | 370/449 |
| 6,366,566 B1 | * | 4/2002 | Scott | 370/280 |
| 6,693,911 B2 | * | 2/2004 | Yamanaka | 370/395.3 |
| 6,697,345 B1 | * | 2/2004 | Corrigan et al. | 370/330 |
| 6,718,419 B1 | * | 4/2004 | Delvaux | 710/305 |

* cited by examiner

Primary Examiner—Chi Pham
Assistant Examiner—Prenell Jones
(74) Attorney, Agent, or Firm—Bacon & Thomas, PLLC

(57) ABSTRACT

The invention is a kind of ATM communication interface, named Pseudo-UTOPIA interface. By this interface, an ATM device can communicate with standard UTOPIA PHY devices through a high-speed transmission medium with a most efficient way (minimum transmission delay) and without the need of any extra devices. The Pseudo-UTOPIA interface can be used in both the UTOPIA Level 2 and Level 1 mode. The cost can thus be significantly reduced.

20 Claims, 7 Drawing Sheets

ATM COMMUNICATION SYSTEM AND METHOD FOR UTOPIA INTERFACE

BACKGROUND OF THE INVENTION

1. Field of Invention

The invention relates to an ATM (Asynchronous Transfer Mode) communications system and method. More specifically, the invention relates to a communications system and method using the ATM. The UTOPIA interface between the ATM layer and the PHY layer in a network communications protocol stack is improved.

2. Related Art

A protocol is like a language. Through a specific communication protocol, information can be communicated between two parties. The protocol is processed between layers and provides services from the low layer to the high layer. In order to transmit data between the layers successfully, both of them have to use the same protocol. Therefore, the protocol plays an important role in digital communications. Without a common protocol, users cannot communicate with each other at all.

In communication, the most famous model of protocol stack is the OSIRM (Open System Interconnect Reference Model) with seven layers. The ATM basic reference model is based upon the physical layer and the data link of the OSIRM. As shown in FIG. 1, the ATM basic reference model includes an ATM physical layer (PHY) 101, an ATM layer (ATM) 102, an ATM adaptation layer (AAL) 103, and other higher layers 104. The UTOPIA (Universal Test & Operation PHY Interface for ATM) 105 is a standard communications interface mainly used between the ATM 102 and the PHY 101.

In the ATM basic reference model, the PHY 101 is equivalent to the physical layer of the OSIRM, providing a transmission channel for data cells in the ATM layer 102. The data cells transmitted from the ATM layer 102 is added with an overhead to form a continuous bit stream. After receiving a continuous bit stream transmitted from a medium, effective data cells are extracted and sent to the ATM layer 102. The ATM layer 102 companied with the AAL layer 103, equivalent to the data link in the OSIRM, is responsible for the network link establishment and data cell transmissions. The AAL layer 103 is in charge of adapting high layer protocol packet to data cells. Other higher layers 104 receive and pack user data and send them to the AAL 103.

The processing unit of the ATM is a data cell. In the ATM standard, the data cell has a fixed length of 53 bytes, within which a header occupies 5 bytes and a payload uses the rest 48 bytes. In the data cell, each bit is transmitted in the transmission path in a continuous stream. Each data cell belongs to an actual transmission path.

The standard UTOPIA interface 105 is the one mainly used between the ATM layer 102 and the PHY 101. The ATM layer 102 inquires the PHY 101 through polling to obtain response signals of whether data should be transmitted or received before data are actually sent or received.

The working models of the UTOPIA include Level 1 and Level 2. The working model of UTOPIA Level 1 is a 1ATM-1PHY architecture, as shown in FIG. 1. There are four working models for UTOPIA Level 2: (1) 1 ATM-1 PHY, (2) 1 ATM-Multi PHY, (3) Multi ATM-1 PHY, and (4) Multi ATM-Multi PHY. However, most chips with the UTOPIA Level 2 interface only support 1ATM-Multi PHY. Therefore, we will take the UTOPIA Level 2 (2) 1 ATM-Multi PHY as an example to explain the standard UTOPIA interface technology.

FIG. 2 shows signals transmitted between the 1ATM-Multi PHY in the standard UTOPIA Level 2 communications interface. In the transmitting interface, the ATM layer 102 provides TxClk, TxAddr, TxEnb, TxData, and TxSOC signals to the multi PHY 101. The Multi PHY 101 sends a TxClav signal to the ATM layer 102. The TxClk signal is a synchronized clock from the ATM layer 102 that synchronizes the Multi PHY 101. The TxAddr signal contains 5-bit long positioning address sent from the ATM layer 102 for polling the PHY 101 or assigning transmissions on a selected PHY 101 when acting along with the TxEnb signal. The TxEnb signal is a signal sent out from the ATM layer 102 to enable the data cell transmission for the transmitting interface. As said before, it can act along with the TxAddr signal to assign transmissions on a selected PHY 101. The TxData signal is a channel through which the ATM layer 102 transmits data to the PHY 101. The TxSOC signal is an indication signal of the beginning of the data cell. The TxClav is a signal that is used by a PHY 101 to respond to the polling from the ATM layer 102.

With reference to FIG. 3A, the timing diagram of UTOPIA transmitting interface, the ATM layer 102 inquires each PHY 101 whether data can be transmitted before the data are really transmitted by polling. At this moment, the ATM layer 102 uses the TxAddr signal to appoint a PHY 101 to inquire. The inquired PHY then uses the TxClav signal to respond its availability to the ATM layer 102 at the next clock. Therefore, the ATM layer 101 can inquire one PHY every two clocks. Through the PHY availability states collected by polling, the ATM layer 101 determines the transmissions of data cells (using TxEnb, TxAddr, TxSOC, and TxData). The UTOPIA thereby completes data cell transmissions and flow controls.

With further reference to FIG. 2, in the receiving interface, the ATM layer 102 provides RxClk, RxAddr, and RxEnb receiving signals to the Multi PHY 101. The Multi PHY 101 provides RxData, RxSOC, and RxClav receiving signals to the ATM layer 102. The RxClk signal is a synchronized clock from the ATM layer 102 that synchronizes the Multi PHY 101. The RxAddr signal contains 5-bit long positioning address sent from the ATM layer 102 for polling the PHY 101 or assigning transmissions on a selected PHY 101 when acting along with the RxEnb signal. The RxEnb signal is a signal sent out from the ATM layer 102 to enable the cell transmission for the receiving interface. As said before, it can act along with the RxAddr signal to assign transmissions to a selected PHY 101. The RxData signal is a channel through which the ATM layer 102 transmits data to the PHY 101. The RxSOC signal is an indication signal of the beginning of the data cell. The RxClav signal is a signal that used by the PHY 101 to respond to the polling from the ATM layer 102.

With reference to FIG. 3B, the timing diagram of UTOPIA receiving interface, the ATM layer 102 inquires each PHY 101 whether data is available for transferring before the data are indeed transferred by polling. The inquired PHY then responds with the RxClav signal. The ATM layer 101 can inquire one PHY every two clocks. Through the PHY availability states collected by polling, the ATM layer 101 determines the transmissions of data cells (using RxEnb, RxAddr, RxSOC, and RxData). The UTOPIA thereby completes data cell receptions and flow controls.

From FIGS. 3A and 3B, one knows that the communications between the ATM layer 102 and the PHY 101 have to satisfy the timing defined by the standard UTOPIA interface 105 in order to correctly transmit/respond information. If the timing of the UTOPIA polling has some errors, the ATM layer 102 will receive incorrect availability state response from the PHY 101. This will result in failure of the flow control mechanism and cause errors in transmitting/receiving data cells. If there are errors in the timing of the UTOPIA data cell transmit interface/receive interface, it may induce errors into the cell content. That is, in effect, the incorrect timing in polling and/or cell transmit interface/receive interface can result in fetal errors to the UTOPIA interface.

Under normal conditions, the ATM device 13 and the PHY device 15 are directly connected. The UTOPIA interface can assure normal operation of data transmissions between the ATM device 13 and the PHY device 15. However, due to high port density and high-speed switching demands for modem communication systems, the communication system structure becomes somewhat more complicated. Under some conditions, system designers hope that the UTOPIA ATM device 13 can connect to the UTOPIA PHY device 15 through a transmission medium 10. A consequence of this is that the UTOPIA work timing between the ATM device 13 and the PHY device 15 cannot be compliant with the standard UTOPIA timing. If no other mechanism is used to conquer this problem, the communication system cannot use such a structure to reach expected effects.

To solve the timing problem, the widely used and most direct method is to introduce two buffers 11, 12 in the upper and lower sides of the transmission medium 10 (see FIG. 4). In this structure, the upper buffer 11 must support the standard UTOPIA PHY interface to interact with the UTOPIA ATM device 13 in the same way as the lower buffer 12 supports standard UTOPIA ATM interface to interact with the UTOPIA PHY device 15. In the Tx direction (cell transferred from ATM device to the PHY device), the upper buffer 11 receives and buffers cells that transmitted from the ATM device 13. The cells are then transferred to the lower buffer 12 through the transmission medium 10. Afterwards, the lower buffer 12 regenerates the cells in its standard UTOPIA ATM interface and transfers the cells to the UTOPIA PHY device 15. Similarly, in the Rx direction (cell transferred from PHY device to the ATM device), the cells transmitted from the UTOPIA PHY device 15 will be received and buffered by the lower buffer 12, transferred through the transmission medium 10, regenerated by the upper buffer 11 in its standard UTOPIA PHY interface, and finally arrive at the UTOPIA ATM device 13. In this way, the timing problem can be solved.

However, this method has extra steps in signal transmissions between the ATM device 13 and the PHY device 15, and results in the introduction of unnecessary transmission delay. Not only is the system structure more complicated, the buffers' add-in also increases the cost. Therefore, this invention proposes a communication system/method that uses an improved UTOPIA interface between the ATM layer and PHY layer, so that no extra devices are needed in a high-speed transmissions structure described in the preceding paragraph. In comparison with the prior art, the invention indeed achieves the goals for a simplified structure, higher speed and lower cost.

An objective of the invention is to propose an improved UTOPIA interface. We call it a Pseudo-UTOPIA interface. The Pseudo-UTOPIA interface accurately adjusts the standard UTOPIA interface timing mechanism so that the ATM device that supports the disclosed interface can easily connect to a standard UTOPIA PHY device through another high-speed transmission medium. The ATM device and the standard UTOPIA PHY device can achieve optimal transmission efficiency (minimal transmission delay) through a high-speed transmission medium in an economical way (without introducing extra buffers).

SUMMARY OF THE INVENTION

As seen in the prior art, the standard UTOPIA interface timing mechanism may be destroyed (on both sides of the high-speed transmission interface) by the high-speed transmission medium to which the UTOPIA chip is connected. Although different transmission media/techniques have different timing mechanisms and transmission delays, they all have a common feature that they have a fixed transmission delay respectively. Therefore, the basic idea of the invention is that: according to the medium's specific transmission delay, we can modify the ATM device's UTOPIA timing and behavior mechanism into a Pseudo-UTOPIA mode. This modification is in such a way that the ATM device can compensate for the transmission delay introduced by the transmission medium using its Pseudo-UTOPIA interface, and the interface between the transmission medium and UTOPIA PHY device can still remain as a standard UTOPIA interface. Moreover, the improved ATM chip with the Pseudo-UTOPIA interface can directly connect to any standard UTOPIA PHY device through the high-speed transmission medium without the need of other devices such as buffers.

Since the Pseudo-UTOPIA interface does not need buffers, signal-regenerating devices, and any other supplementary devices, no extra transmission delays will be introduced except the high-speed transmission medium itself. Therefore, the invention achieves the effect of a most efficient transmission (i.e. minimum transmission delay) under this transmission structure (UTOPIA interfaces are connected through a high-speed transmission medium).

The improved UTOPIA interface proposed by the invention allows the ATM device to directly connect to any device with the standard UTOPIA PHY interface through a high-speed transmission medium. The case where the ATM device and the PHY device are directly connected without any high-speed transmission medium is a special case of the Pseudo-UTOPIA interface as the transmission delay of the high-speed transmission medium being 0. Therefore, the Pseudo-UTOPIA interface is a superset of the standard UTOPIA interface.

BRIEF DESCRIPTION OF THE DRAWINGS

The present invention will become more filly understood from the detailed description given hereinbelow illustration only, and thus are not limitative of the present invention, and wherein.

DETAILED DESCRIPTION OF THE INVENTION

The standard UTOPIA communications protocol defines a method for the bi-directional data transmissions between the ATM device and the PHY device in the asynchronous transfer mode. It defines the name and purpose of a signal, a flow control mechanism, a data cell exchange mechanism, and the timing of signals during the actions of these mechanisms (see the description in Related Art). Via this standard UTOPIA interface, cells can be well transmitted and received between the ATM device and PHY device.

But when the ATM device and the PHY device that support the standard UTOPIA interface are connected through a high-speed transmission medium, the transmission delay caused by the transmission medium will make the signals between the ATM device and the PHY device no longer satisfy the standard UTOPIA timing. The invention thus proposes a communication system and method with an improved UTOPIA interface to solve this problem. A Pseudo-UTOPIA interface is disclosed in this specification. The Pseudo-UTOPIA interface does not change the purposes and definitions of original signals in the standard UTOPIA interface. It achieves the objective by accurately adjusting relative action timings among the signals. The ATM device and the PHY device can then realize the most efficient cell transmission at the minimum signal transmission delay. The timing mechanism adjusting method proposed for the Pseudo-UTOPIA interface is applicable to both UTOPIA Level 1 and Level 2.

Figure 5:
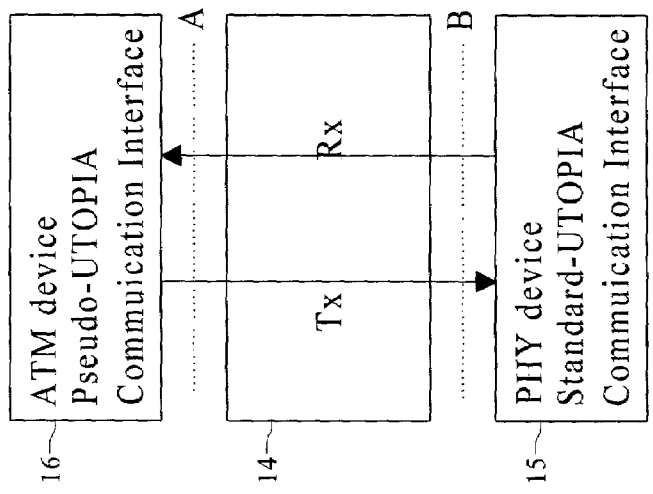
FIG. 5 is a system block diagram of the invention that the ATM device utilizes the Pseudo-UTOPIA interface.
Figure 4:
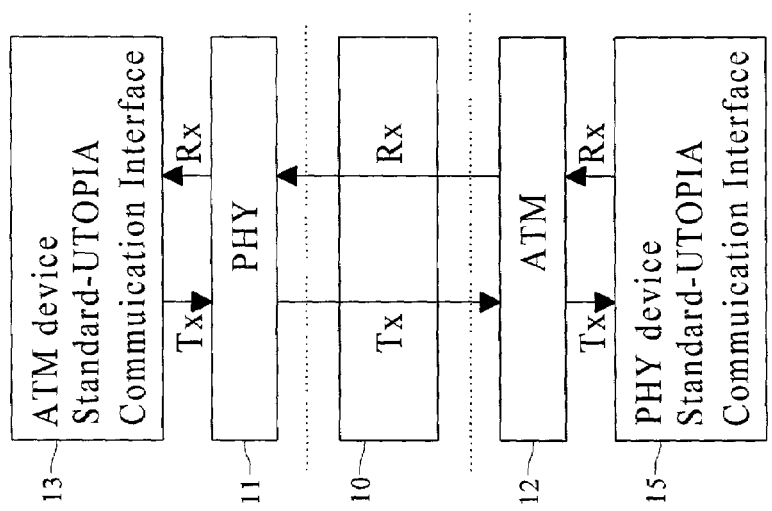
FIG. 4 is a system block diagram of a conventional art that introduces buffer in the upper side and lower side of the high-speed transmission medium.

With reference to FIG. 5, the ATM layer and the PHY layer in the disclosed communications system are connected through a high-speed transmission medium. The standard UTOPIA interface defined by the ATM forum in the PHY device 15 is preserved, while that in the ATM device 13 is improved to a Pseudo-UTOPIA interface.

In the transmission direction (Tx, cell transferring from the ATM device 16 to the PHY device 15), all signals transmitted from the ATM device 16 to the PHY device 15 have the same transmission delay. Suppose the transmission delay from point A to point B (also point B to point A) is T clocks. Although the signals from point A to point B have experienced T clocks of delay, the relative timing among them remained unchanged. With the TxClav signal sent out from the PHY device 15, all signals at point B satisfy the standard UTOPIA interface timing. At point A, however, the ATM device 16 cannot immediately receive the response signal TxClav from the PHY device 15 at the next clock after its sending out the polling address by TxAddr because the sent address reaches point B after T clock of delay. The PHY device sends out the TxClav response signal after receiving the address signal. This response signal experiences another T clocks of delay before it reaches point A. At this moment, the response signal has been delayed by T*2 clocks than the standard UTOPIA interface. Thus, the invention delays the relative timing between the polling address TxAddr and the response signal TxClav in the polling mechanism of the standard UTOPIA transmission interface by T*2 clocks. Therefore, in the Tx direction, the transmission delay problem can be solved. This is the transmission mechanism for the Pseudo-UTOPIA interface.

Figure 1:
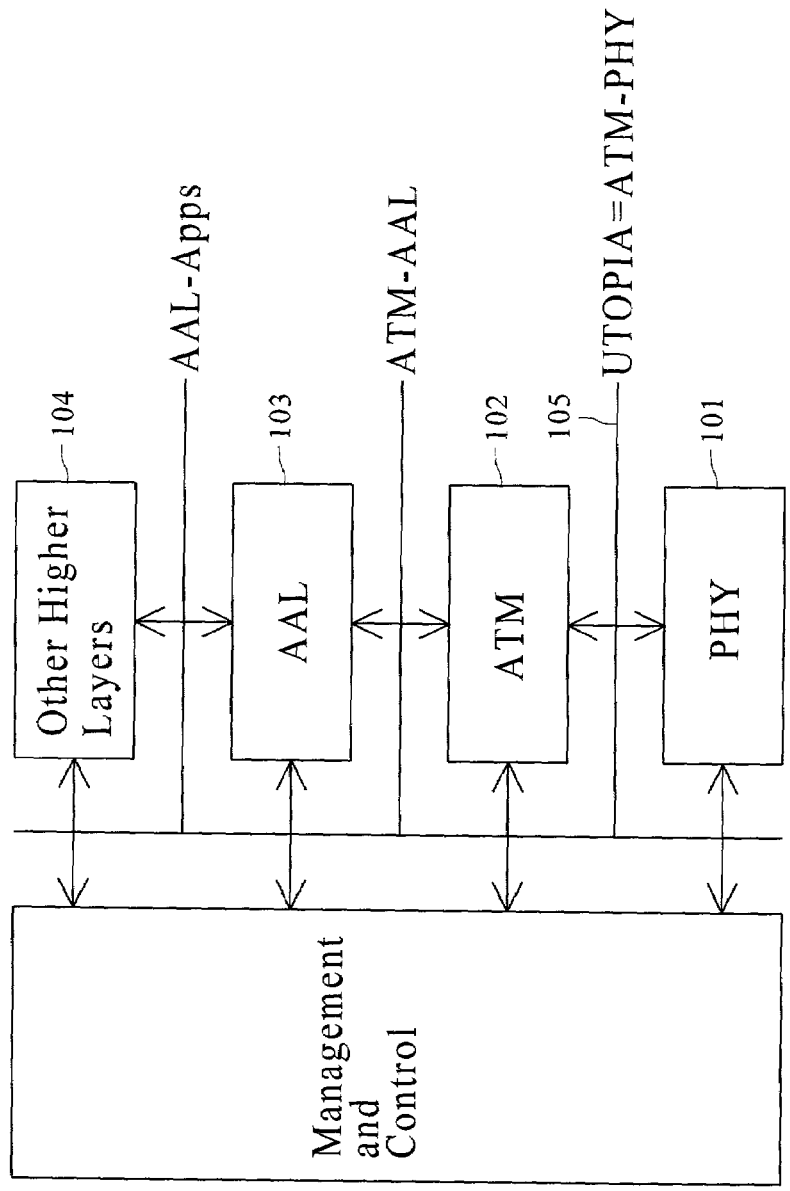
FIG. 1 shows the structure of an ATM basic reference model.
Figure 2:
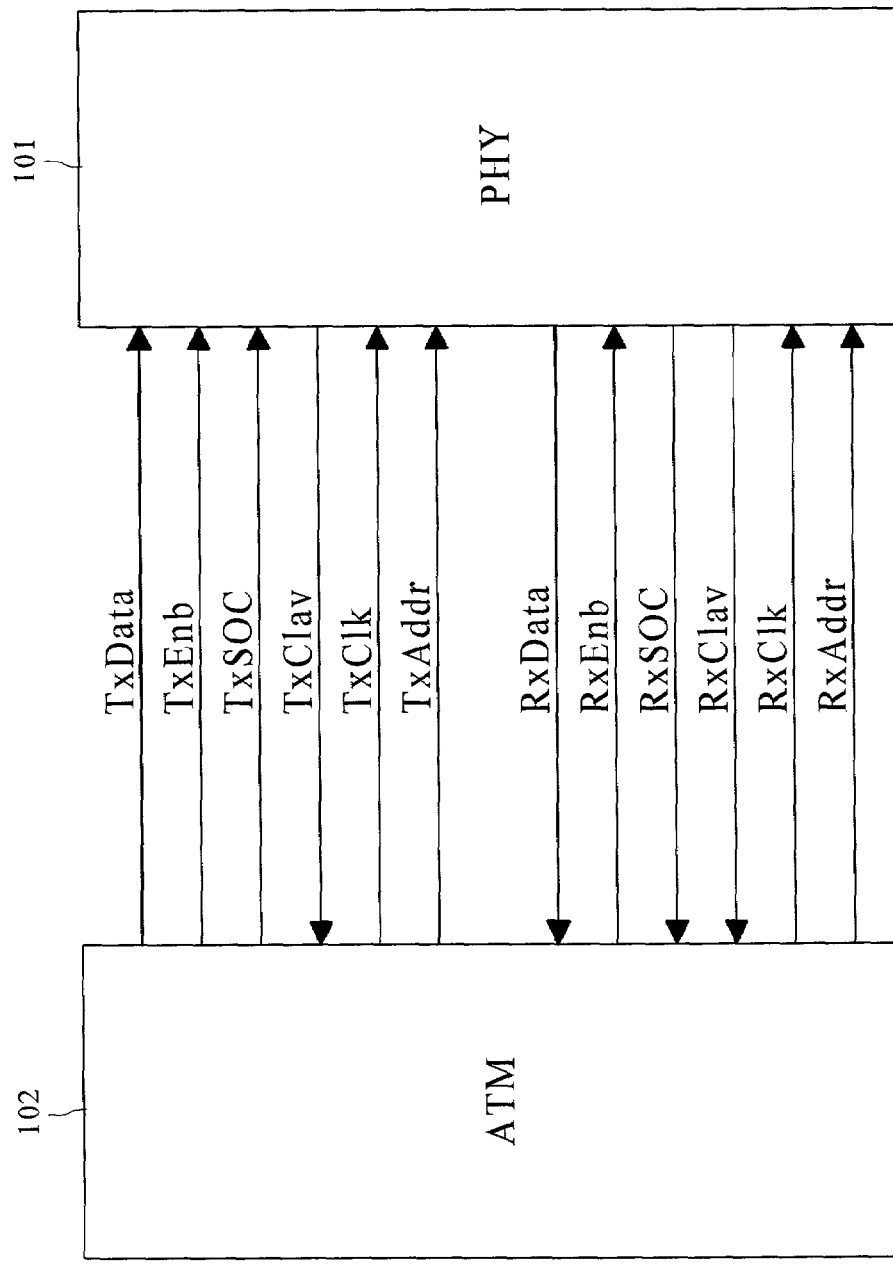
FIG. 2 is a block diagram of a standard UTOPIA interface that transmits and exchanges signals in the prior art.
Figure 3A:
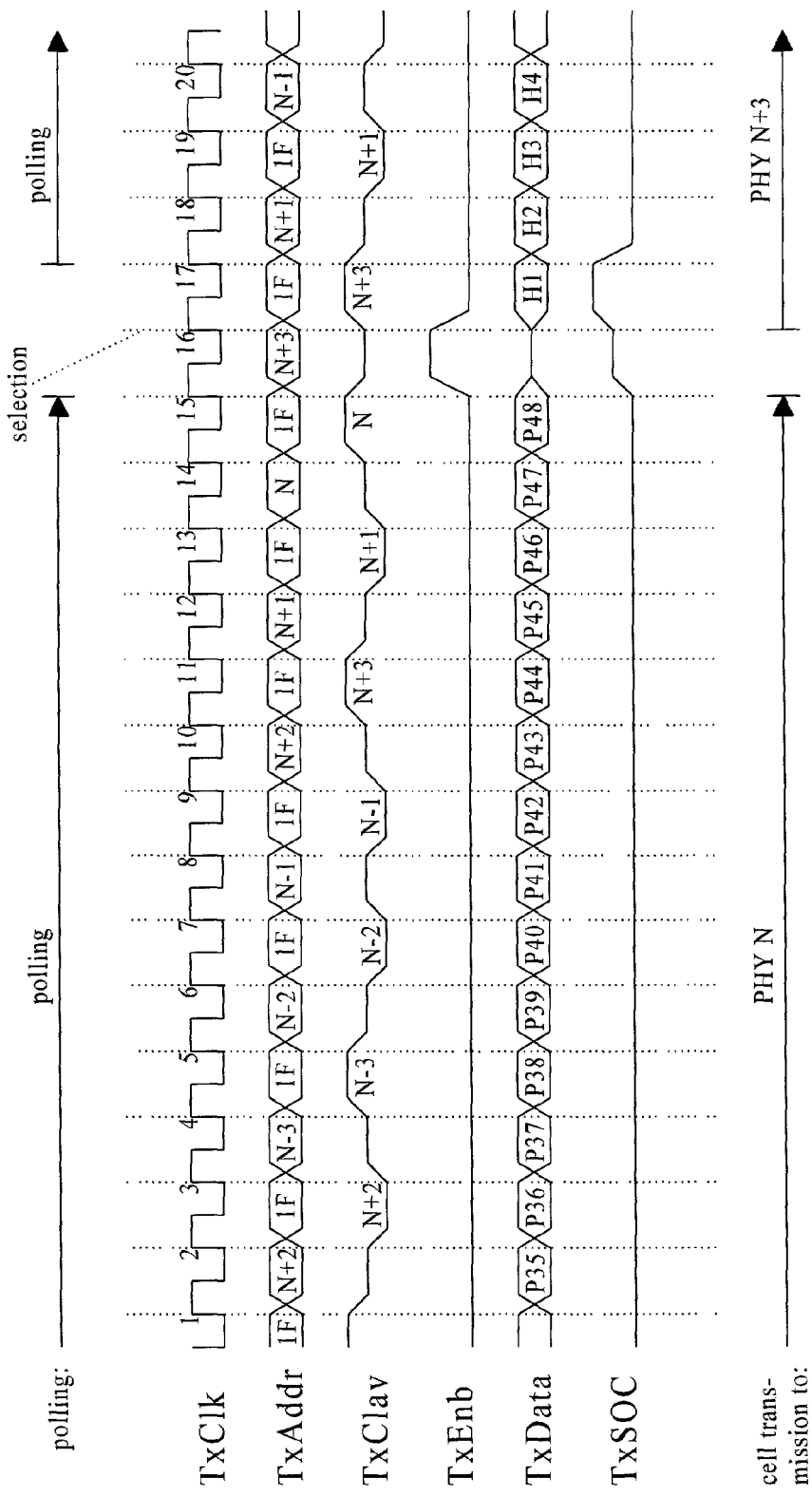
FIG. 3A is a timing diagram of transmitting signals in a conventional standard UTOPIA interface.

Take T=1 as an example. When comparing FIG. 6 and FIG. 3A, one can find that the polling mechanism timings of the Pseudo-UTOPIA transmission interface and the standard UTOPIA transmission interface are different. The relative timing between the polling address TxAddr and the polling response signal TxClav of the Pseudo-UTOPIA is delayed by two clocks in comparison with the standard UTOPIA interface. These two clocks are used by the Pseudo-UTOPIA interface to compensate the signal transmission round-trip delay caused by the high-speed transmission medium. With the help of such a timing adjustment, the ATM device and the PHY device can restore the correct action of the UTOPIA flow control mechanism even though they are connected through a high-speed transmission medium. The cells can also be correctly sent and received from ATM device to PHY device.

With further reference to FIG. 5, in the reception direction (Rx, cell transferring from the PHY device 15 to the ATM device 16), the point B has a timing that satisfies the standard UTOPIA reception interface. At point A, the polling mechanism faces the same problem as in the transmission direction. The invention can also use the strategy same as transmission direction to solve this timing problem.

However, in addition to this problem, the interface in the reception direction has another problem that the transmission interface does not have. Since TxEnb, TxData, and TxSOC are in the same transmission direction and all experience the same delay in the transmission interface, the relative timing is not affected by the transmission medium. In the reception interface, RxEnb has the opposite direction to RxData and RxSOC. When RxEnb is transmitted from the ATM device to the PHY device, it already experiences T clocks of transmission delay. Then the PHY device receives RxEnb and sends out RxData and RxSOC signals. These signals experience another T clocks of transmission delay before they reach the ATM device. For the ATM device, the RxData and RxSOC signals have a lag by T*2 clocks from the standard UTOPIA timing. The invention, therefore, modifies (in effect, delays) the relative timing between RxEnb and both RxData and RxSOC in the UTOPIA reception interface by T*2 clocks. This is the reception mechanism timing in the Pseudo-UTOPIA interface.

Figure 3B:
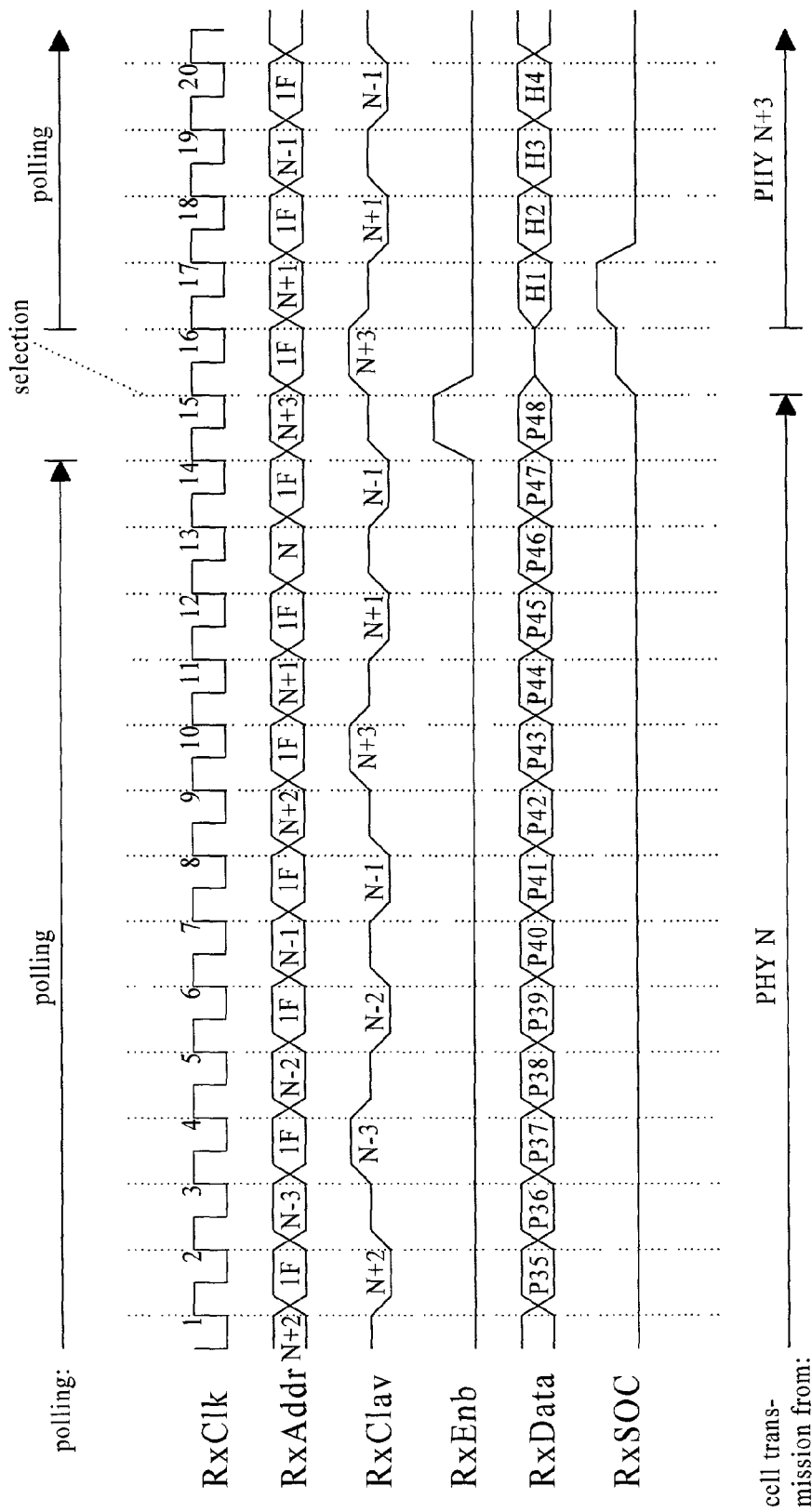
FIG. 3B is a timing diagram of receiving signals in a conventional standard UTOPIA interface.

Take T=1 as an example. Comparing FIG. 7 and FIG. 3B, one can clearly find that the timings of the polling mechanisms (timing between RxAddr and RxClav) in the Pseudo-UTOPIA reception interface are different from the standard UTOPIA interface, but the same as the Pseudo-UTOPIA transmission interface. Besides, the relative timing between RxEnb and RxSOC/RxData also has an extra 2 clocks lag from the standard UTOPIA receive interface. With such a timing adjustment, the ATM device and the PHY device can still have proper UTOPIA flow control and cell transfer in the receive interface even when they are connected through a high-speed transmission medium.

Figure 6:
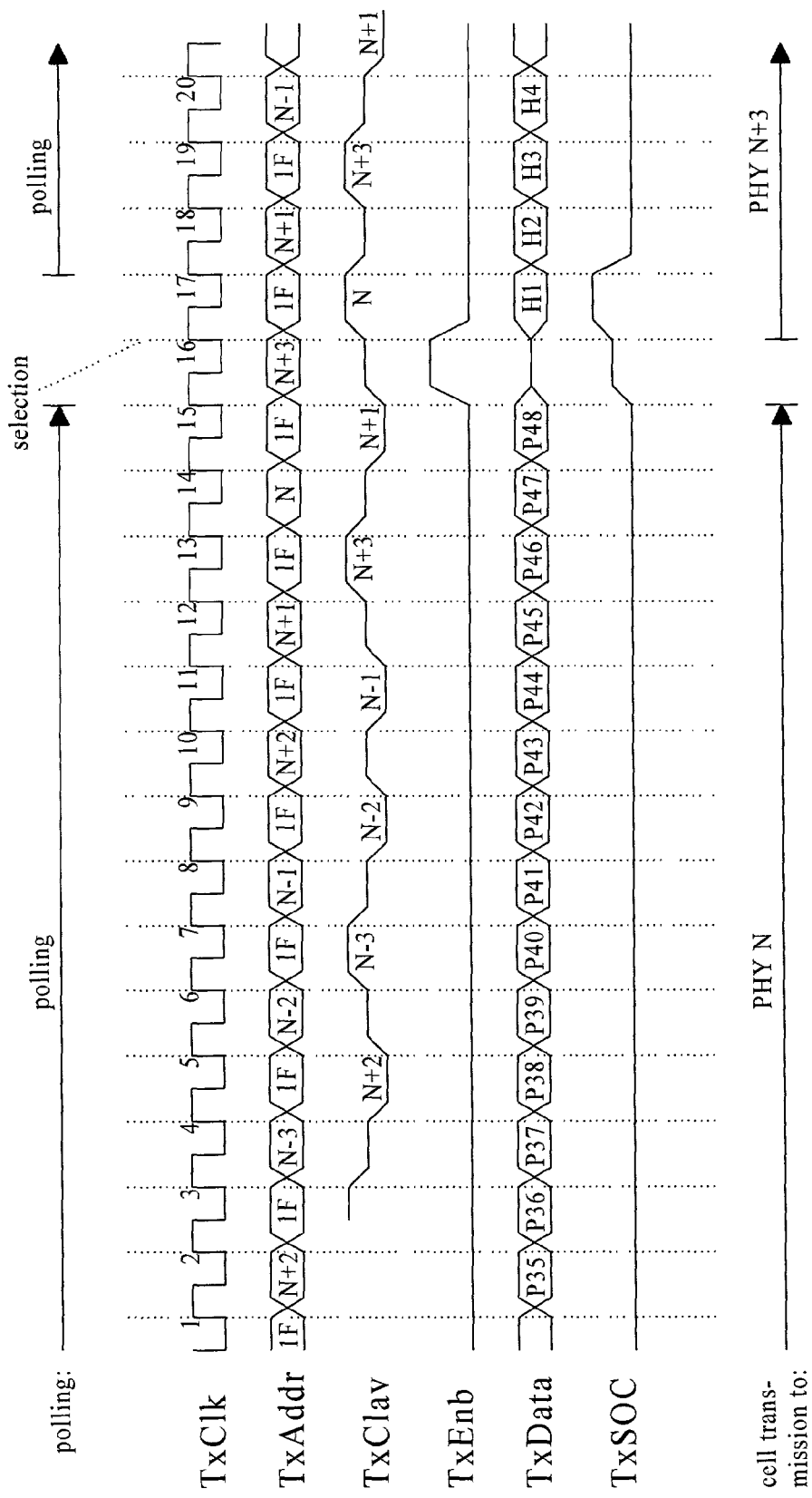
FIG. 6 is a timing diagram of the disclosed Pseudo-UTOPIA interface in the Tx direction.
Figure 7:
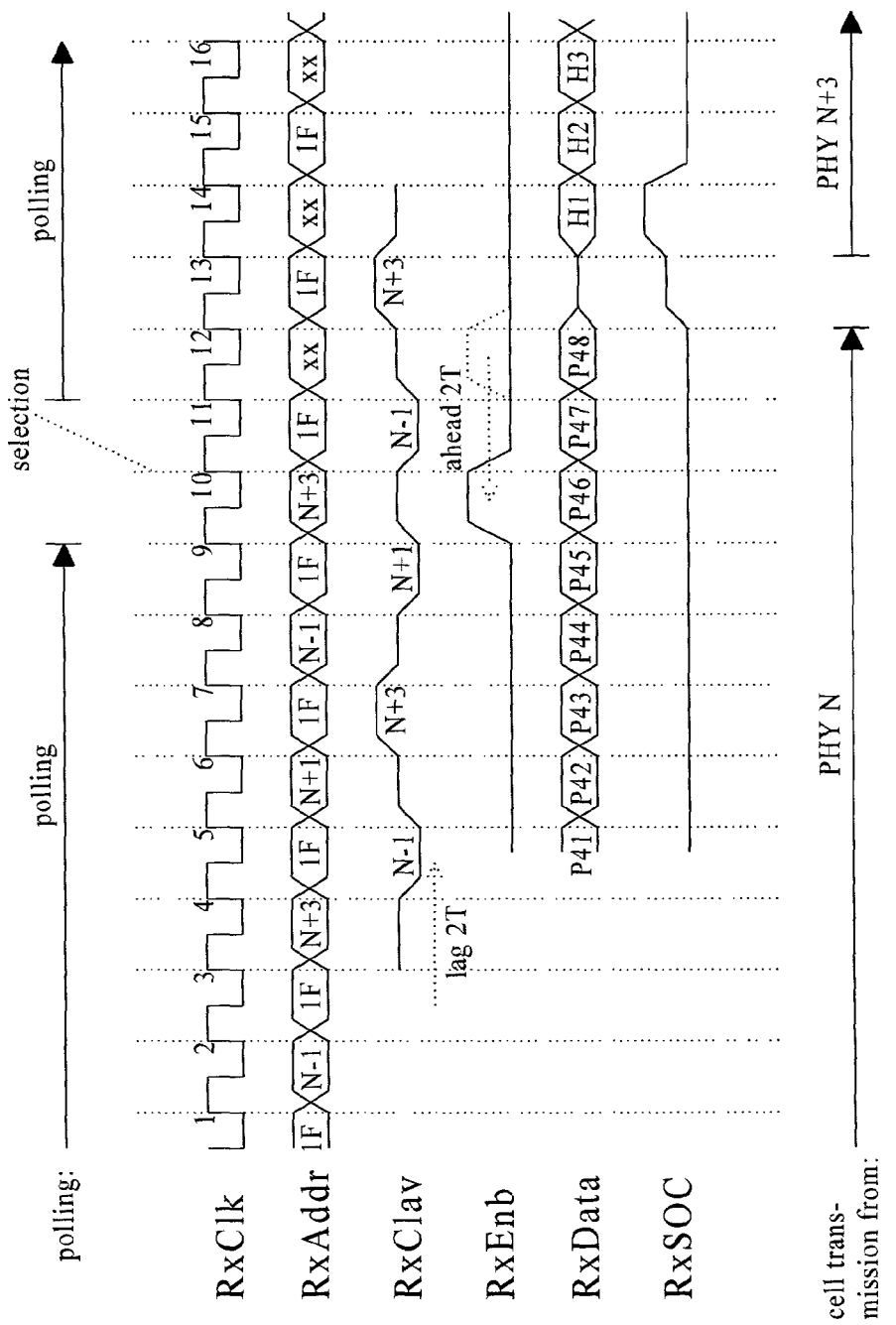
FIG. 7 is a timing diagram of the disclosed Pseudo-UTOPIA interface in the Rx direction.

As shown in FIGS. 6 and 7, one can clearly see the differences between the invention and the prior art. With the Pseudo-UTOPIA interface, the ATM device will not expect the response from PHY device just one clock after its sending out the polling address. If it is the original standard UTOPIA interface, the ATM device 13 will recognize incorrect response signals. However, the disclosed Pseudo-UTOPIA interface can prevent this kind of errors from happening. Therefore, the ATM device 16 can receive the correct response signal from the PHY device 15.

Under the consideration of the fact that there are many different transmission media/techniques available and different transmission media/techniques can cause different transmission delays, the invention makes the transmission delay compensated by the Pseudo-UTOPIA interface be programmable. That is, no matter what transmission medium and technique are used, as long as the transmission delay is limited within a finite range, the invention can properly get over the transmission delay problem by simply programming the transmission delay correctly. When the transmission delay is set as "0", the Pseudo-UTOPIA interface is the same as the standard UTOPIA interface in effect.

From the above description, one learns that the Pseudo-UTOPIA interface changes the timing mechanism of the standard UTOPIA interface to overcome the possible transmission delay in actual communications system to achieve the most efficient transmissions. The functions of each signal in the Pseudo-UTOPIA interface are kept the same as the standard UTOPIA interface. Therefore, either UTOPIA Level 1 or Level 2 can use this method. The interface can be applied to system structures such as 1 ATM-1 PHY, 1 ATM-Multi PHY, Multi ATM-1 PHY, and Multi ATM-Multi PHY.

The invention is not limited to the embodiments disclosed herein. For instance, there is no definite standard for the interface between the AAL layer and ATM layer in the ATM basic reference model. The conventional technique may also use the standard UTOPIA interface to connect the ATM device and the AAL device.

EFFECTS OF THE INVENTION

The Pseudo-UTOPIA interface disclosed herein solves the signal transmission timing and recognition problems caused by the high-speed transmission medium between the standard UTOPIA ATM device and the PHY device. In such an architecture, the Pseudo-UTOPIA interface make it possible for the ATM device and PHY device to communicate with each other without the need of extra buffers that are often used in the prior art. The signal transmissions are faster and more efficient, and the space of the PCB can be saved. The cost and complexity of the system architecture can also be effectively reduced.

What is claimed is:

1. An ATM (Asynchronous Transfer Mode) communications method, comprising the steps of:
    changing the relative timing between a polling address signal and a response signal in a standard UTOPIA (Universal Test & Operation PHY Interface for ATM) interface;
    changing the relative timing between an enable signal and a data signal in the receive interface of the standard UTOPIA interface.

2. The method of claim 1, wherein the UTOPIA interface is a communicatons interface used between an ATM layer and a PHY (Physical) layer.

3. The method of claim 2, wherein changing the relative timing between signals is to elongate the relative timing by a delay time.

4. The method of claim 3, wherein the delay time is the time needed for a signal to travel from the ATM layer to the PHY layer and then from the PHY layer back to the ATM layer.

5. The method of claim 1, wherein the UTOPIA interface is an ATM communications interface used between the AAL (ATM Adaptation layer) and the ATM layers.

6. The method of claim 5, wherein changing the relative timing between signals is to elongate the relative timing by a delay time.

7. The method of claim 6, wherein the delay time is the time needed for a signal to travel from the ATM layer device to the AAL layer and then from the AAL layer back to the ATM layer.

8. The method of claim 1, wherein the polling address signals include TxAddr in the transmit interface and RxAddr in the receive interface.

9. The method of claim 1, wherein the response signals include TxClav in the transmit interface and RxClav in the receive interface.

10. The method of claim 1, wherein the enable signal in the receive interface is RxEnb and the data signals in the receive interface are RxData and RxSOC.

11. An ATM communications system containing an ATM device including a receive interface, wherein a relative timing between a polling address signal transmitted by the ATM device and a response signal is elongated by a delay time, and a relative timing between an enable signal and data signals in a receive interface is elongated by the same delay time, thereby enabling the ATM device is arranged to properly process the polling mechanism and receive transmitted data signals.

12. The system of claim 11, wherein a high-speed transmission medium is inserted between an ATM layer and PHY layer of the ATM communications system.

13. The system of claim 12, wherein a communication interface of the ATM device is connected to the PHY device of the PHY layer.

14. The system of claim 13, wherein the delay time is the time needed for a signal to travel from the ATM device to the PHY device and then from the PHY device to the ATM device through the high-speed transmission medium.

15. The system of claim 11, wherein a high-speed transmission medium is inserted between AAL and the ATM layers.

16. The system of claim 15, wherein the communications interface of the ATM device is connected to the AAL device of the AAL layer.

17. The system of claim 16, wherein the delay time is the time needed for a signal to travel from the ATM device to the AAL device and then from the AAL device back to the ATM device through the high-speed transmission medium.

18. The system of claim 11, wherein the polling address signals are TxAddr in the transmit interface and RxAddr in the receive interface defined in the standard UTOPIA interface.

19. The system of claim 11, wherein the response signals are TxClav in the transmit interface and RxClav in the receive interface defined in the UTOPIA interface.

20. The system of claim 11, wherein the enable signal in the receive interface is RxEnb and the data signals in the receive interface are RxData and RxSOC defined in the standard UTOPIA interface.

* * * * *